US008072181B2

(12) United States Patent
Koch (10) Patent No.: US 8,072,181 B2
(45) Date of Patent: Dec. 6, 2011

(54) CONTROLLER FOR ELECTRICALLY ADJUSTABLE FURNITURE

(75) Inventor: Walter Koch, Schwanberg (AT)

(73) Assignee: LOGICDATA Electronic & Software Entwicklungs GmbH, Deutschlandsberg (AT)

( * ) Notice: Subject to any disclaimer, the term of this patent is extended or adjusted under 35 U.S.C. 154(b) by 322 days.

(21) Appl. No.: 12/355,958

(22) Filed: Jan. 19, 2009

(65) Prior Publication Data

US 2009/0185403 A1 Jul. 23, 2009

Related U.S. Application Data

(63) Continuation of application No. PCT/EP2007/057375, filed on Jul. 17, 2007.

(30) Foreign Application Priority Data

Jul. 20, 2006 (DE) .......................... 10 2006 033 712

(51) Int. Cl.
*G05B 9/00* (2006.01)

(52) U.S. Cl. ....................................... 318/808; 318/445

(58) Field of Classification Search .................. 318/445, 318/727, 729, 808, 811, 812
See application file for complete search history.

(56) References Cited

U.S. PATENT DOCUMENTS

| | | | |
|---|---|---|---|
| 4,468,724 A | 8/1984 | Omae et al. | |
| 4,617,501 A * | 10/1986 | Smith | 318/459 |
| 5,528,449 A * | 6/1996 | Koch | 361/160 |
| 5,932,979 A | 8/1999 | Sun | |
| 6,404,609 B1 * | 6/2002 | Mansfield et al. | 361/103 |
| 6,509,705 B2 * | 1/2003 | Bastholm et al. | 318/434 |
| 6,595,144 B1 * | 7/2003 | Doyle | 108/147 |
| 6,614,199 B1 * | 9/2003 | Bokamper et al. | 318/445 |
| 6,690,132 B2 | 2/2004 | Koch | |
| 6,841,953 B2 * | 1/2005 | Bastholm | 318/7 |
| 7,423,397 B2 * | 9/2008 | Katahira | 318/432 |
| 7,567,050 B2 * | 7/2009 | Bellingroth | 318/466 |
| 2003/0030396 A1 * | 2/2003 | Bastholm et al. | 318/434 |
| 2005/0276020 A1 * | 12/2005 | Ahmad | 361/698 |

FOREIGN PATENT DOCUMENTS

| | | |
|---|---|---|
| DE | 32 13 057 A1 | 12/1982 |
| DE | 9316465 | 1/1994 |
| DE | 199 21 344 A1 | 11/2000 |
| DE | 100 12 050 A1 | 10/2001 |
| EP | 0 803 969 A1 | 10/1997 |
| FR | 1.478.466 | 4/1967 |

* cited by examiner

*Primary Examiner* — Eduardo Colon Santana (74) *Attorney, Agent, or Firm* — Slater & Matsil, L.L.P.

(57) ABSTRACT

A controller for electrically adjustable furniture includes a main-voltage area and a low-voltage area that are electrically isolated from one another. A rectifying power supply unit, which is located in the main-voltage area, serves to generate a rectified voltage available at power supply terminals from an alternating main voltage. The rectified voltage present at the power supply terminals can be delivered to a first motor terminal located in the main-voltage area depending on a first control signal. The controller furthermore includes a first control unit that is located in the main-voltage area and which incorporates an operating terminal and a first control output for the supply of a first control signal. An operating unit located in the low-voltage area is connected via an electrically isolating coupling to the operating terminal.

21 Claims, 7 Drawing Sheets

CONTROLLER FOR ELECTRICALLY ADJUSTABLE FURNITURE

This application is a continuation of co-pending International Application No. PCT/EP2007/057375, filed Jul. 17, 2007, which designated the United States and was not published in English, and which claims priority to German Application No. 10 2006 033 712.3 filed Jul. 20, 2006, both of which applications are incorporated herein by reference.

TECHNICAL FIELD

Embodiments of the invention concern a controller for electrically adjustable furniture as well as an application of the controller.

BACKGROUND

Many tables, in particular writing desks with table-tops on which the height of the table-top can be adjusted by means of a special drive are available on the market nowadays. The height or inclination of beds such as recliner beds or hospital beds may also be adjusted by means of electrical drives.

It is possible to use DC motors for the drive, operating from a low voltage of about 12 V up to 24 V. For this purpose the main voltage, which in Europe is typically around 230 V, is reduced by a transformer to the lower voltage range of the DC motors, and converted to a DC voltage by a rectifier circuit. The motors can be driven through controlled connection of the motors to the low DC voltage. A controller circuit board, coupled to operating elements, may be used for this and may, for instance, be arranged together with a transformer and the rectifier circuit. It is, however, necessary for this kind of controller to incorporate one or more transformers which, due to the high power consumption of the electric motors, have correspondingly large dimensions and therefore represent a not insignificant cost factor in the manufacture of controllers of this type.

Another option for the drive of electrically adjustable furniture consists in the use of AC motors that can be powered from the alternating main voltage. Here, the AC motors are not regulated, and are simply connected to their supply voltage from the alternating main. In this case, however, the option of regulating the drive is not available. This is particularly problematic if a number of motors need to be operated at the same time and must therefore be synchronized.

SUMMARY

In one aspect, the invention provides a controller for electrically adjustable furniture that can be manufactured economically and efficiently, yet which nevertheless provides accurate control for the motors. In another aspect, the invention provides an application for the controller.

In one exemplary embodiment of the invention, a controller for electrically adjustable furniture comprises a main-voltage area and, electrically isolated from it, a low-voltage area. A rectifying power supply arrangement, located in the main-voltage area, serves to generate a direct voltage at power supply terminals, obtained from the alternating main voltage. Depending on a first control signal, the rectified voltage present at the power supply terminals can be delivered to a first motor terminal, also located in the main-voltage area. A first control unit incorporates an operating terminal and a first control output where the first control signal is supplied. The first control unit is located in the main-voltage area. An operating unit, located in the low-voltage area, is connected through an electrically isolating coupling to the operating terminal of the first control equipment.

Separating the controller into a main-voltage area and a low-voltage area makes it possible for the operating equipment which may, for instance, be accessible to a human user, to be powered by a low voltage, with a magnitude of just a few volts, which is not hazardous to humans. This avoids the possibility that the user comes into contact with and receives an electric shock from the higher voltage of the main-voltage area, deriving from the alternating main voltage, which in Europe is typically around 230 V and in North America around 115 V.

At the same time, the provision of the DC voltage at the power supply terminals of the power supply equipment permits accurate control of the voltage supplied to a DC motor. It is also possible to avoid the need to use a transformer dimensioned for high powers, since the power supply equipment directly converts the alternating main voltage provided by an alternating voltage power supply network into the DC voltage, or directly generates the DC voltage from the alternating main voltage.

In different embodiments of the invention, conventional rectifiers or similar, using rectifier diodes or controlled transistor bridges, can be used for the rectifying power supply equipment.

In other embodiments of the invention it is possible, for instance, to employ additional sensors for the acquisition of various states of a motor connected to a motor terminal, such as for a motor current or a speed of motor rotation. This allows even more precise control or regulation of the connected motor.

The controller may also include further motor terminals for additional motors that can be independently controlled or regulated by means of the control unit.

Because the high voltages in the main-voltage area, in particular the direct voltages in the controller, can give rise to strong electrical fields, it is possible, in order to screen the electric fields, for conductors in the main-voltage area that carry the high-voltage to be provided with shields comprising, for instance, metal foil or implemented by a woven metal braid. If the controller is fitted in a housing such as a plastic housing, it is again possible to attach a metal foil or a metal plate that is connected to a reference potential terminal such as, for instance, a common ground, to at least one side of the housing, for instance to the inside of the housing on the top.

A controller according to embodiments of the invention can, for instance, be used in association with a table whose height is electrically adjustable, such as a writing desk or a workbench. A controller according to embodiments of the invention can, furthermore, also be used on electrically adjustable beds, such as recliner beds or beds in hospitals or used for nursing.

BRIEF DESCRIPTION OF THE DRAWINGS

The invention is explained below in more detail through several embodiments with the aid of the figures. Elements with the same function or which have the same effect are given the same reference numbers.

The following list of reference numbers can be used in conjunction with the drawings:

1: Main-voltage area
2: Low-voltage area
10: Rectifying power supply unit
11: Power supply terminals
12: Main terminals
13: Main isolating relay
14: Alternating voltage sensor
20, 20a: Motor terminals
21, 21a: Current sensors
22, 22a: Rotation speed sensor
23, 23a: Transistor
231, 232, 233, 234: Transistor
T1, T2, T3, T4: Transistor
24, 24a: Switching unit
241, 242: Switch
242a, 242a: Switch
30, 43: Control unit
31, 31a: Control output
32: Operating terminal
33, 33a: Current sensor terminal
34, 34a: Rotation speed sensor terminal
35: Analog/digital converter
36, 36a: Polarity outputs
37: Relay control output
38: Alternating voltage sensor input
40: Operating unit
41, 42: Sensor unit
44, 44a: Rotation speed sensor terminal
45: OR-gate
50: Coupling
51, 52, 53: Optocoupler
60, 61: Motor
70: Power supply unit
71: Transformer
72: Rectifier
100: Housing
110: Foil
130: Relay controller
131, 132: Relay controller input
C: Smoothing capacitor
D: Rectifier diode
MS1, MS2: Control signal
SH: Shield

DETAILED DESCRIPTION

Figure 1:
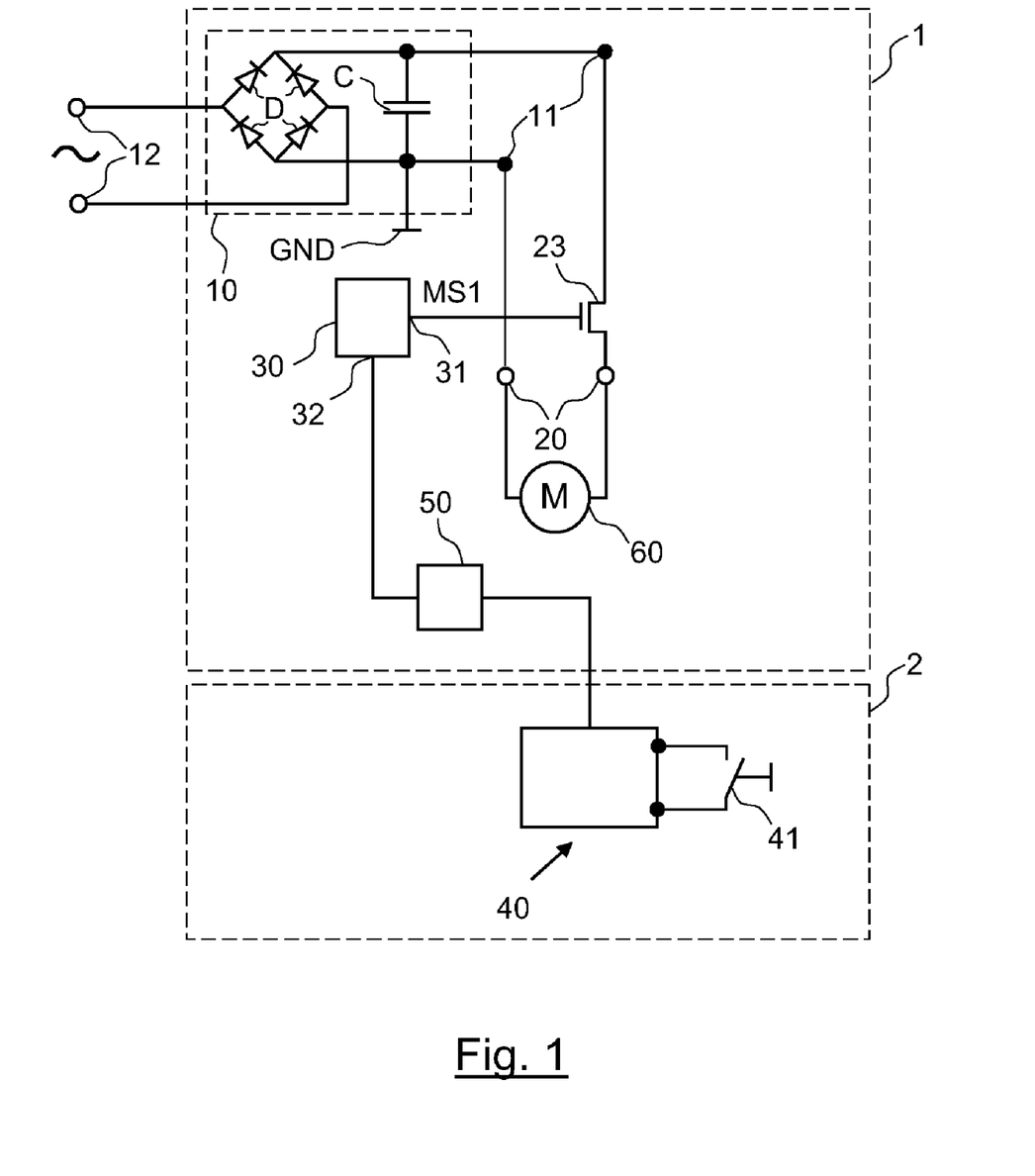
FIG. 1 shows a first embodiment of a controller according to the invention.

FIG. 1 shows an exemplary embodiment of a controller according to the invention for electrically adjustable furniture. A rectifying power supply unit 10 having four diodes D connected for full wave rectification and a smoothing capacitor C are provided. The input of the rectifier 10 is connected to main terminals 12. One pole of a motor terminal 20 is connected directly to the power supply terminals 11 of the rectifier 10, while the other pole is connected through a transistor 23. The negative pole of the power supply terminal 11 is connected to a reference potential terminal GND.

A first control unit 30 includes a first control output 31 through which a first control signal MS1 can be supplied to the control terminal of the transistor 23. An electric motor 60, preferably implemented as a DC motor, is connected to motor terminal 20. The rectifier 10, the first motor terminal 20 and the first controller equipment 30 are located in a main-voltage area 1 that is designed for voltages in the range between about 100 to 400 V.

An operating unit 40 that is located in a low-voltage area 2 is connected via an electrically isolating coupling 50 and operating terminal 32 of the control unit 30. The electrically isolating coupling 50 can, for instance, comprise an optocoupler, but may also be an infrared connection or a radio connection. The electrically isolating coupling 50 is, in the embodiment illustrated, located in the main-voltage area 1. It can, however, also be located at a point between the main-voltage area 1 and the low-voltage area 2. It is only necessary to ensure that the low-voltage area 2 is not electrically in contact with the higher voltage of the main-voltage area 1.

The operating unit 40 incorporates a sensing device 41, by means of which a user can transmit control commands. The first sensor 41 is implemented in this embodiment as a simple switch or push-button, but can be replaced by other sensors without exceeding the scope of the invention.

An alternating main voltage such as that from a conventional alternating power supply network is supplied via the main terminals 12 to the controller or to the rectifier 10. The rectifier 10 converts the alternating main voltage into a rectified, smoothed, direct voltage that is made available to the power supply terminals 11. The full wave rectifier, here implemented as a bridge rectifier, can also be replaced by other rectifier circuits, such as by a center-tapped rectifier or a low-cost half-wave rectifier.

The first control unit 30 is configured to generate a first control signal MS1 to control the transistor 23 depending on signals at the operating terminal 32 that are transmitted by the operating unit 40. The control unit 30 can, for instance, generate a pulse-width modulated signal that periodically turns transistor 23 on. As a result, the motor terminal 20 will see a time-average of a direct voltage that depends on the DC voltage made available at the power supply terminals 11 and on the duty cycle of the pulse-width modulated control signal MS1. This will result in rotation of the motor or in movement of the drive for an electrically adjustable item of furniture.

The controller illustrated thus offers both the possibility of precise control of an electrical motor as well as protecting a user against hazardous voltage from the main-voltage area 1. In addition, a transformer dimension for high powers for the supply of power to the motor can be omitted.

Figure 2:
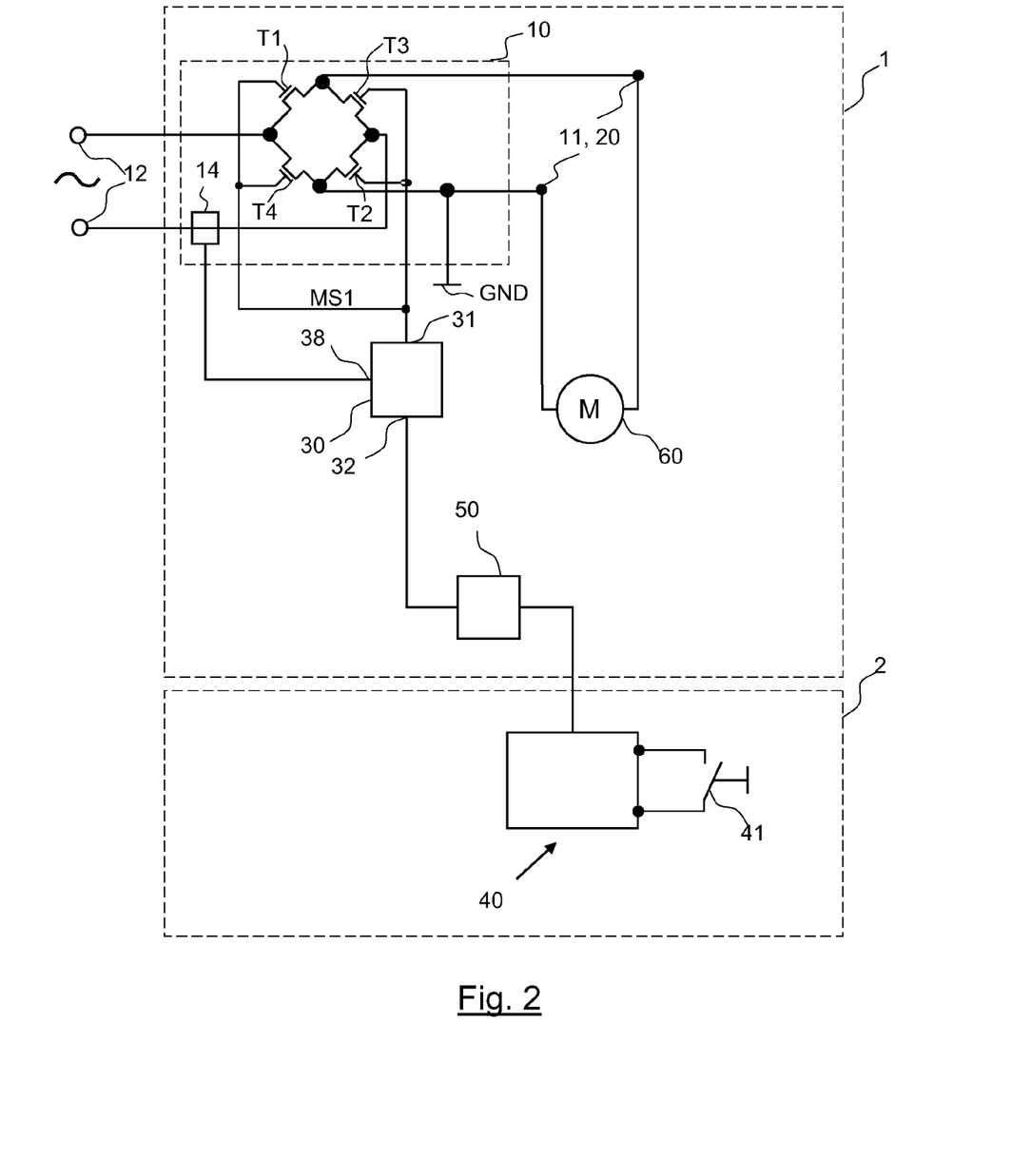
FIG. 2 shows a second embodiment of a controller according to the invention.

FIG. 2 illustrates a further embodiment of a controller according to the invention, in which the rectifying power supply unit 10 comprises a transistor bridge comprising transistors T1, T2, T3 and T4. A first path containing transistors T1 and T3, and a second path comprising transistors T2, T4 are connected between the main terminals 12 for the supply of the alternating main voltage. The control terminals of the transistors T1, T2, T3 and T4 are coupled to a first control output 31 of the first control unit 30. Connecting nodes of the transistors T1, T2, T3 and T4, which are connected in two series pairs, constitute the power supply terminals 11 of the rectified voltage. In addition, the power supply unit 10 incorporates an alternating voltage sensor 14 that is coupled to an alternating voltage sensor input 38 of the first control unit 30.

Through alternating excitation of the transistors T1, T2 and of transistors T3, T4 the alternating main voltage is output as a rectified, unipolar voltage to the power supply terminals 11 or to the motor terminal 20. In order for this to occur synchronously with the phase of the alternating main voltage, the phase can be detected by means of the alternating voltage sensor 14. For instance, the transistors T1, T2 are turned on during a positive half wave, while transistors T3, T4 are turned on during a negative half wave. In order to change the polarity of the voltage at the motor terminal 20, and therefore to change the direction of the motor's rotation, the excitation is inverted, so that transistors T3, T4 are turned on during a positive half wave, and transistors T1, T2 are turned on during a negative half wave. A conductive path for the current through motor terminal 20 is thus alternately provided by transistors T1, T2 and transistors T3, T4.

The excitation can also be provided only during a portion of a half wave, in order to change the effective voltage at the motor terminal.

Figure 3:
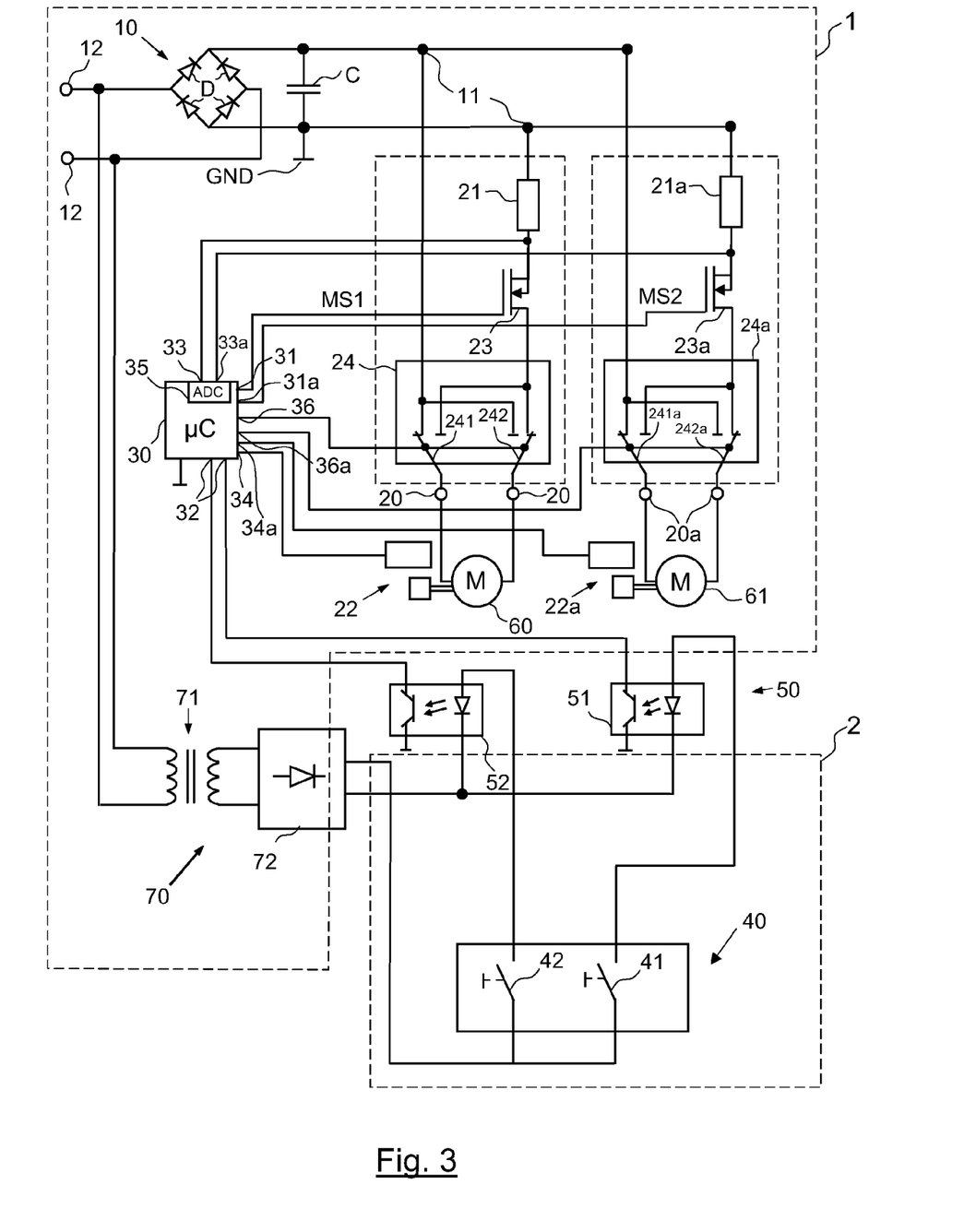
FIG. 3 shows a third embodiment of a controller according to the invention.

In one version of the embodiment, a smoothing capacitor C is connected between the power supply terminals 11 (as shown in the embodiment of FIG. 3).

FIG. 3 illustrates a further exemplary embodiment of a controller according to the invention. Here, in addition to the first motor terminal 20, a second motor terminal 20a is included, serving to provide the voltage for a second motor 61. In a similar manner to the first motor terminal 20, the second motor terminal 20a is coupled through a transistor 23a to the power supply terminals 11. In addition, the conductive paths of motors 60, 61 incorporate current sensors 21, 21a, here implemented as special resistors for current measurement, also known as shunts. The first current sensor 21, and the second current sensor 21a are dimensioned for the measurement of a motor current through the first motor terminal 20 or through the second motor terminal 20a respectively, and are coupled over a measuring line to a first and second current sensor terminal 33, 33a respectively of the first control unit 30.

The first control unit incorporates an analog/digital converter 35 to convert the analog signals from the current sensors 21, 21a into digital signals.

The second transistor 23a is connected to a second control output 31a of the first control unit 30. At the second control output 31a, in just the same way as at the first control output 31, a second control signal MS2 is output for controlling the transistor 23a, and this signal can differ from the first control signal MS1. Other controllable switching elements can be employed in the place of the transistors 23, 23a.

A first and a second rotation speed sensor 22, 22a are also provided in order to measure a speed of rotation at the motor terminals 20, 20a of the connected motors 60, 61. In this embodiment, the rotation speed sensors 22, 22a each incorporate a Hall sensor. It is, however, possible for further Hall sensors to be provided for the rotation speed sensors 22, 22a used in order, for instance, to determine the direction of the rotation.

Through the feedback of information about the currents flowing through the motors 60, 61 and the speeds of rotation of the motors 60, 61, a control loop can be constructed that permits precise regulation of the movement of the drives. This makes it possible, for instance, to provide synchronized operation for the drive of motors that, while theoretically having the same structure, nevertheless have slight differences as a result of manufacturing variations. Equally it is possible to compensate for different movements or different excursions resulting from different mechanical loads applied to the motors.

In addition, a first and a second switching unit 24, 24a are provided for changing a polarity of a DC voltage that can be supplied to a first and second motor terminal 20, 20a, each of which is coupled to a first or second polarity output 36, 36a of the first control unit 30. The switching units 24, 24a each here comprise switches 241, 242 and 241a, 242a respectively that can be switched together and thus are able to affect a voltage or current direction through the motors 60, 61. In this way it is, for instance, possible to set the rotation in which the motors 60, 61 rotate.

The illustrated embodiment moreover includes a power supply unit 70 to supply the operating unit 40 with a low rectified voltage. The power supply unit 70 here comprises a transformer 71 that converts the alternating main voltage to a lower voltage that is required to power the operating unit, and a rectifier 72. The transformer 71 only has to pass a low power, and is therefore small and economical. The power supply unit 70 can also be used to supply power to the first control unit 30. In this case the transformer 71 can be designed to deliver electrically isolated first and second low voltages, as a result of which the electrical separation between the main-voltage area 1 and the low-voltage area 2 is still provided.

Both the operating unit 40 and the first control unit 30 can also be supplied with operating voltage from other sources of power, such as from batteries, accumulators or other power sources that are independent of the alternating main voltage. Switched-mode power supplies can also be used to provide this power.

In addition to the first sensing device 41 implemented as a push-switch, the operating unit 40 contains a second push-switch 42. The states into which the switches 41, 42 are placed are transmitted via the optocouplers 51, 52 of the electrically isolating coupling 50 to the operating terminal 32 of the first control unit 30.

The control signals MS1, MS2 are generated in the control unit 30, which is implemented, for instance, as a microcontroller. The operating unit 40 serves, in this embodiment, merely to transmit the user's push-switch commands.

Figure 4:
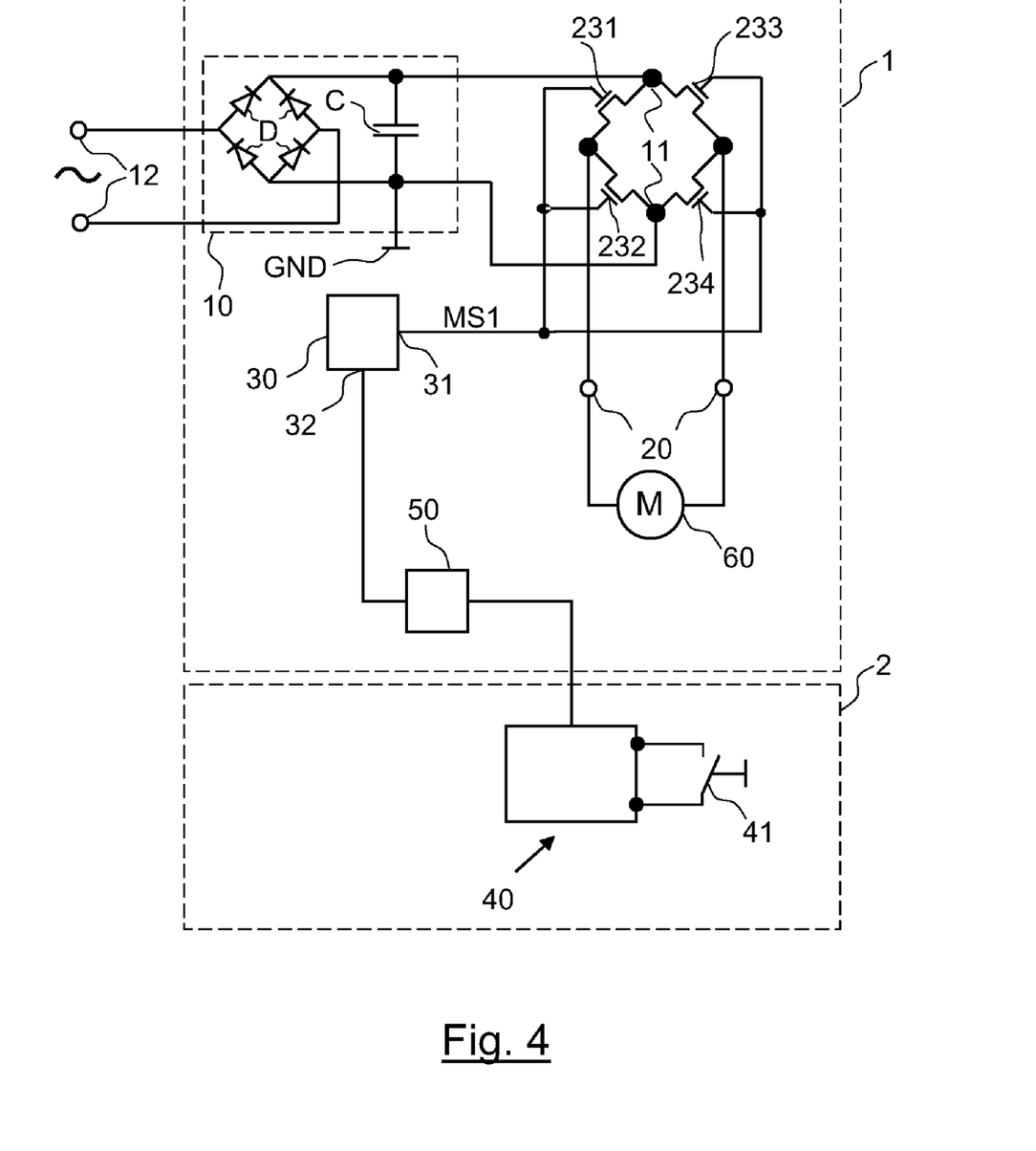
FIG. 4 shows a fourth embodiment of a controller according to the invention.

FIG. 4 illustrates a further embodiment of a controller according to the invention. Here, the main-voltage area 1 contains a transistor bridge with transistors 231, 232, 233, 234, that connects two of the current paths connected to the power supply terminals 11, each through two of the transistors 231, 232, 233, 234 connected in series. The control terminals of the transistors 231, 232, 233, 234 are coupled to the first control output 31. The connecting nodes of the two pairs of transistors connected in series 231, 232 or 233, 234 constitute the first motor terminal 20.

Through simultaneous excitation of transistors 231, 234 or of transistors 232, 233, the DC voltage from the rectifier 10 is supplied to the motor terminal 20. In order to change the polarity of the voltage at the motor terminal 20, and thereby to change the direction in which the motor is rotating, the excitation is changed over, so that either transistors 231, 234, or transistors 232, 233 are excited. A conductive path for the current through the motor terminal 20 is thus alternately formed by transistors 231, 234 or by transistors 232, 233. The control signal MS1 can, as in the embodiment according to FIG. 1, be a pulse-width modulated signal, supplied either to transistors 231, 234 or to transistors 232, 233.

Figure 5:
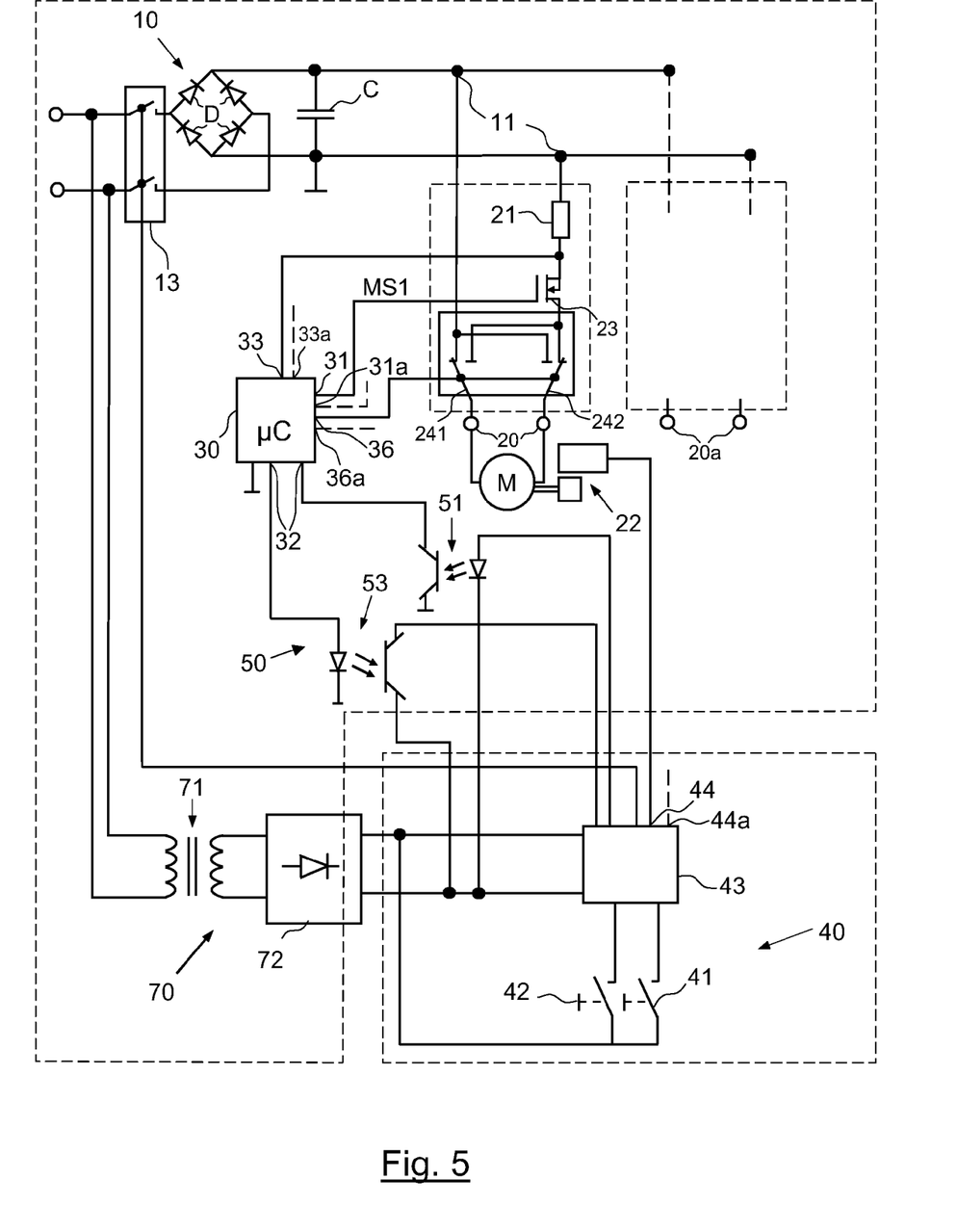
FIG. 5 shows a fifth embodiment of a controller according to the invention.

FIG. 5 shows a further exemplary embodiment of a controller according to the invention. Here the operating unit 40 incorporates a second control unit 43 that is designed to control at least the first motor terminal 20. A second motor terminal 20a is shown merely as an example in the drawing of FIG. 3. The rotation speed sensors 22, 22a are connected to the second control unit 43, implemented, for instance, as a microcontroller, through terminals 44, 44a. The states into which the push-switches 41, 42 are placed are also noted by the second control unit 43.

The first and second control units 30, 43 are coupled via a serial link through the electrically isolating coupling 50. The coupling 50 comprises a first optocoupler 51 for transmitting data from the second to the first control units 43, 30, as well as a second optocoupler 53 for transmitting data from the first to the second control unit 30, 43. The coupling 50 therefore represents a bidirectional link between the control units 30, 43. Alternatively, the link can be implemented as a unidirectional link.

The current sensors 21, 21a are, as is also shown in FIG. 3, coupled to the first control unit 30. The information from the current sensors 21, 21a can thus be transmitted via the coupling 50 to the second control unit 43. Control of the voltages of the motor terminals 20, 20a or at the motors 60, 61 can thus be carried out entirely within the second control unit 43, while the first control unit 30 generates the control signals MS1, MS2 depending on the information transmitted by the second control unit 43.

In the embodiment illustrated, the rectifier 10 is coupled through a main isolating relay 13 to the main terminals 12 for the supply of the alternating main voltage. In this embodiment, the main isolating relay is controlled by the second control unit 43. Because the power supply unit 70 is permanently connected to the main terminals 12, the second control unit 43 is still supplied with voltage even when the main isolating relay 13 has disconnected the rectifier 10 from the main terminals 12.

As a result of the separation of the main-voltage area 1 from the alternating main voltage, it is entirely disconnected from power. This provides greater electrical safety to the user. The alternating main voltage is, for instance, separated from the main-voltage area by the main isolating relay 13 if the motor is stationary.

A main isolating relay 13 can also be employed in an embodiment according to one of FIGS. 1 to 4. In this case, excitation of the main isolating relay 13 opens the relay; in other words, it causes disconnection of the alternating main voltage by the first control unit 30. Because, after the disconnection, this may also be disconnected from the power supply, for instance when powered from the main-voltage area 1, it is necessary in this case to close the relay, that is to make the connection to the alternating main voltage by means of a control voltage from the area of the operating unit 40.

Figure 6:
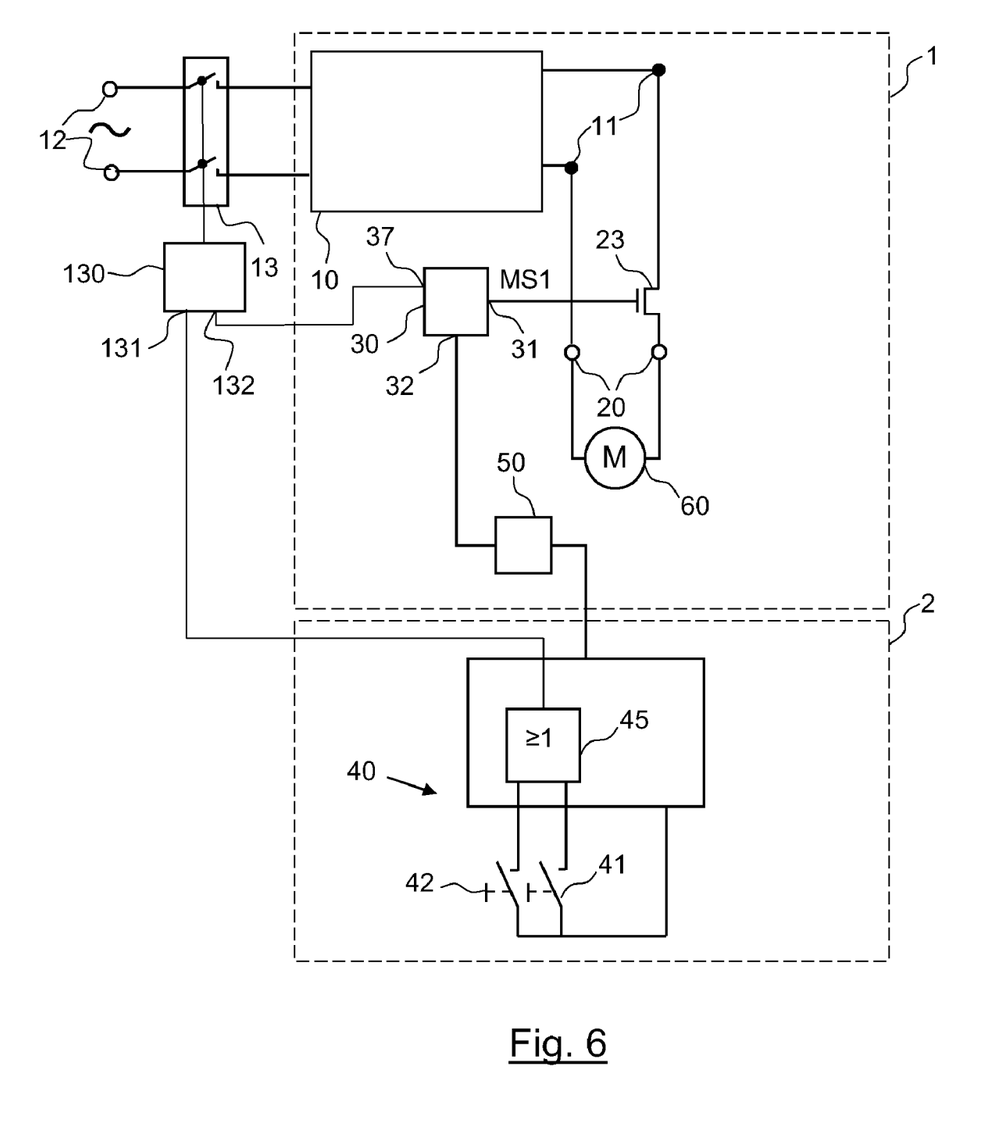
FIG. 6 shows a sixth embodiment of a controller according to the invention.

FIG. 6 illustrates an alternative embodiment of a controller according to the invention, in which the rectifier 10 is coupled through a main isolating relay 13 to the main terminals 12 for the supply of the alternating main voltage. The main isolating relay 13 is excited through a relay controller 130. The relay controller 130 has a first input 131 for the feed of a control signal to close the relay 13, and a second input 132 for the feed of a control signal to open the relay 13. The second input 132 is coupled to a relay controller output 37 of the control unit 30, so that the supply of power for the main-voltage area 1 can be provided by the first control unit 30. The first input 131 is coupled to the output of an OR-gate 45 of the operating unit 40, to the input of which the push-switches 41, 42 are connected. In this way the main isolating relay 13 can be operated by an OR-combination of the signals from push-switches 41, 42, and can switch on the power supply to the main-voltage area 1.

Figure 7:
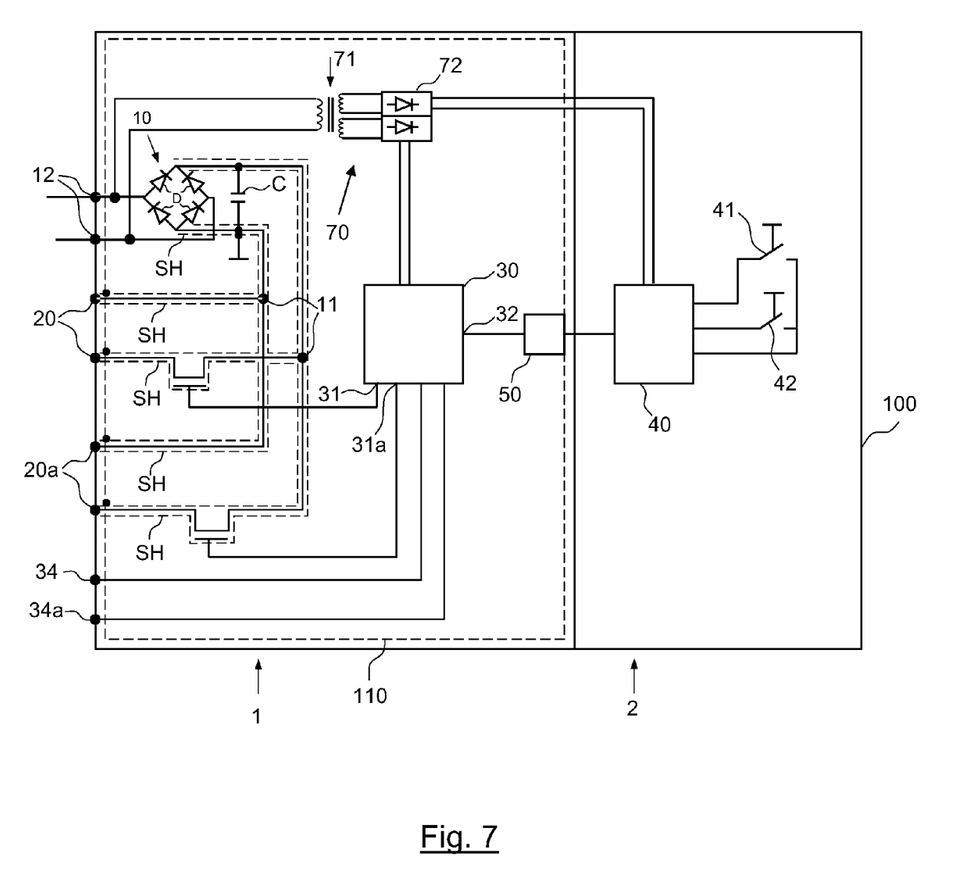
FIG. 7 shows a seventh embodiment of a controller according to the invention.

FIG. 7 illustrates a further embodiment of a controller according to the invention. Here the main-voltage area 1 and the low-voltage area 2 are located within a housing 100; it is also possible to provide separate housings for the main-voltage area 1 and the low-voltage area 2. The power supply unit 70 incorporates a transformer 71 having a first and a second secondary winding, each of which is followed by a rectifier 72, so that the supply voltages for the operating unit 40 and for the first control unit 30 can be provided with secure electrical separation from one another.

The lines from the main rectifier 10 to the motor terminals 20, 20a, where the usually relatively high rectified main voltage is present, have a shield SH. Generally speaking, it is favourable if the lines from the rectifier 10 to the power terminals 11 and/or the lines from the power terminals 11 to the motor terminals 20, 20a have a shield SH. The shield may comprise a metal braid or a metallic foil. A shield of this type can, however, be provided for all of the conductors in the main-voltage area 1.

In addition to this, a metal foil 110 is applied to at least one side of the housing 100, and is connected to a reference potential terminal GND. The metal foil or, alternatively, a metal plate, should be attached in such a way that an electrical field which may potentially be generated during operation by the lines in the main-voltage area 1 are screened in the direction of the user. For that reason it can be adequate if, as illustrated in the embodiment, the metal foil 110 is only applied to the main-voltage area. The foil 110 can also extend over the entire area of the housing incorporating the main-voltage area 1 and the low-voltage area 2.

The foil 110 allows the limit values for the electrical fields that may, for instance, be specified by regulations for electrically adjustable furniture, to be observed.

The lines from the motor terminals 20, 20a to the motors 60, 61, not shown here, should also have corresponding screening.

In addition to the options illustrated in the embodiments for driving the one or two motors, it is also possible with a controller according to the invention to run further motors. If, for instance, the motors for a table with four table legs are each attached to one table leg of adjustable height, the four motors that are necessary in this example can be operated simultaneously by the controller according to the invention. In this case, feedback of motor data provided by, for instance, speed sensors and/or current sensors at each motor, is advantageous. This in turn permits synchronous drive of the motors, thereby allowing the table to be raised smoothly.

When the controller is used with electrically adjustable beds, it is possible to control different movement directions or different adjustment facilities of the bed by means of different motors. In this case it is also possible for several motors, or a group of motors, to be operated at the same time.

What is claimed is:

1. A controller for electrically adjustable furniture, the controller comprising:
   a main-voltage area and a low-voltage area that is electrically isolated from the main-voltage area;
   a rectifying power supply unit located in the main-voltage area and which generates a rectified voltage at power supply terminals from an alternating main voltage;
   a first motor terminal located in the main-voltage area and to which, depending on a first control signal, the rectified voltage present at the power supply terminals can be delivered;
   a first control unit located in the main-voltage area and which includes an operating terminal and a first control output for the supply of the first control signal; and
   an operating unit located in the low-voltage area and which is connected via an electrically isolating coupling to the operating terminal of the first control unit.

2. The controller according to claim 1, further comprising a transistor with a control terminal coupled to the first control output in order to couple the first motor terminal to the power supply terminals.

3. The controller according to claim 1, further comprising a first switching unit for changing a polarity of the rectified voltage that can be supplied to the first motor terminal, and which is coupled to a first polarity output of the first control unit.

4. The controller according to claim 1, further comprising a first current sensor configured to measure a motor current through the first motor terminal, the first current sensor being coupled with a first current sensor terminal of the first control unit.

5. The controller according to claim 4, wherein the first control unit comprises an analog-to-digital converter for converting a signal from the first current sensor.

6. The controller according to claim 1, further comprising a first rotation speed sensor configured to measure a speed of rotation of a motor that is connected to the first motor terminal.

7. The controller according to claim 6, wherein the first rotation speed sensor comprises at least one Hall sensor.

8. The controller according to claim 1, further comprising a power supply unit for powering the first control unit and/or the operating unit, the power supply unit being fed with a rectified low voltage.

9. The controller according to claim 8, wherein the power supply unit comprises a transformer that is configured to deliver a first and a second low voltage electrically isolated from one another.

10. The controller according to claim 1, wherein the first control unit is set up to supply the first control signal as a pulse-width modulated signal.

11. The controller according to claim 1, further comprising a second motor terminal located in the main-voltage area and which, depending on a second control signal, can be coupled to the power supply terminals, and wherein the first control unit has a second control output to deliver a second control signal.

12. The controller according to claim 1, wherein the electrically isolating coupling comprises at least one optocoupler.

13. The controller according to claim 1, wherein the rectifying power supply unit is connected through a main isolating relay to main terminals.

14. The controller according to claim 13, wherein the main isolating relay can be controlled by the first control unit and/or the operating unit.

15. The controller according to claim 1, wherein the lines from the rectifying power supply unit to the power supply terminals and/or lines from the power supply terminals to the first motor terminal incorporate a shield.

16. The controller according to claim 15, wherein the shield comprises a metallic braid or a metallic foil.

17. The controller according to claim 1, wherein at least the main-voltage area is located within a housing, and where a metallic foil is attached to at least one side of the housing and is connected to a reference potential terminal.

18. A controller for electrically adjustable furniture, the controller comprising:
   a main-voltage area and a low-voltage area that is electrically isolated from the main-voltage area;
   a rectifying power supply unit located in the main-voltage area and which generates a rectified voltage at power supply terminals from an alternating main voltage;
   a first motor terminal located in the main-voltage area and to which, depending on a first control signal, the rectified voltage present at the power supply terminals can be delivered;
   a first control unit located in the main-voltage area and which includes an operating terminal and a first control output for the supply of the first control signal;
   an operating unit located in the low-voltage area and which is connected via an electrically isolating coupling to the operating terminal of the first control unit; and
   a first transistor bridge having two current paths connected to the power supply terminals, each current path having two transistors connected in series, the transistors having control terminals coupled to the first control output, and where a connecting node of each pair of series-connected transistors is connected to the first motor terminal.

19. The controller according to claim 18, wherein the rectifying power supply unit comprises a second transistor bridge having two paths connected to main terminals for supply of the alternating main voltage, each containing two transistors connected in series, the transistors having control terminal coupled to the first control output, and where connecting nodes of each of the pairs of series-connected transistors form the power supply terminals.

20. The controller according to claim 19, wherein the rectifying power supply unit comprises an alternating voltage sensor that is coupled to an alternating voltage sensor input in the first control unit in order to determine a phase of the alternating main voltage.

21. A controller for electrically adjustable furniture, the controller comprising:
   a main-voltage area and a low-voltage area that is electrically isolated from the main-voltage area;
   a rectifying power supply unit located in the main-voltage area and which generates a rectified voltage at power supply terminals from an alternating main voltage;
   a first motor terminal located in the main-voltage area and to which, depending on a first control signal, the rectified voltage present at the power supply terminals can be delivered;
   a first control unit located in the main-voltage area and which includes an operating terminal and a first control output for the supply of the first control signal; and
   an operating unit located in the low-voltage area and which is connected via an electrically isolating coupling to the operating terminal of the first control unit, wherein the first control unit is configured to generate the first control signal depending on a signal at the operating terminal which is transmitted by the operating unit.

* * * * *